March 30, 1965 E. C. BRAUN, JR 3,175,422
MEMORY STORAGE PIN DETENT MEANS FOR
ELECTRO-MECHANICAL MEMORIES
Filed May 16, 1962
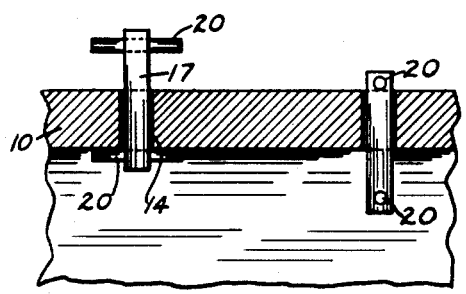
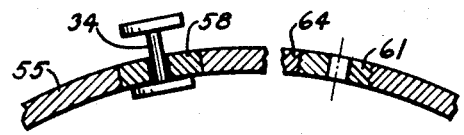
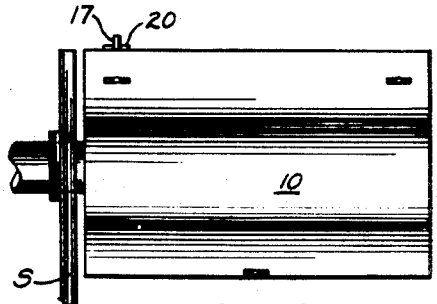
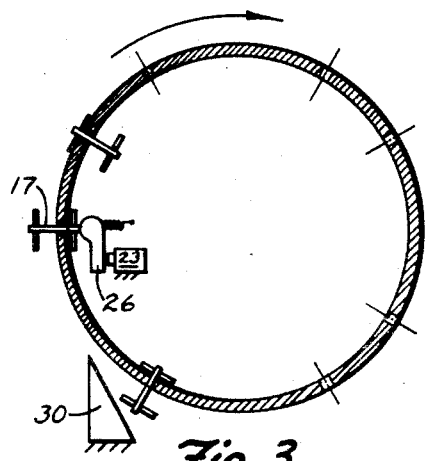
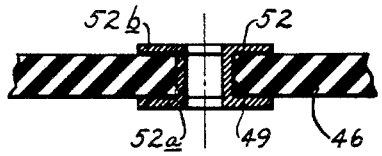
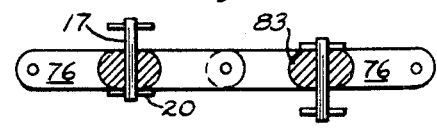
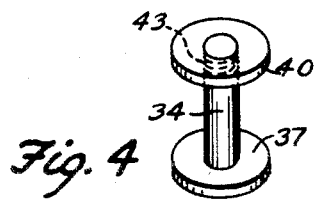
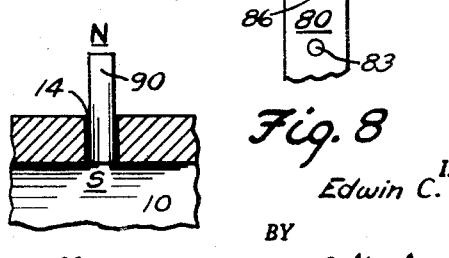
INVENTOR.
Edwin C. Braun, Jr.
BY

United States Patent Office 3,175,422
Patented Mar. 30, 1965

3,175,422
MEMORY STORAGE PIN DETENT MEANS FOR ELECTRO-MECHANICAL MEMORIES
Edwin C. Braun, Jr., Smithsburg, Md., assignor to Aerojet-General Corporation, Azusa, Calif., a corporation of Ohio
Filed May 16, 1962, Ser. No. 195,141
9 Claims. (Cl. 74—568)

This invention relates to automatic conveying systems which comprise electro-mechanical memories, or memory storage means, and more particularly to a detent means for holding memory storage pins in either of two positions in accordance with keyboard control for pre-determining removal stations of articles traveling on a conveyor belt.

In the field of conveyor systems there are numerous machines and patents for machines wherein articles are placed on a conveyor belt and are moved off the belt at particular points therealong in accordance with a pre-determining system under control of an operator at a keyboard. Such systems generally comprise an electro-mechanical memory consisting of a moving element such as a belt or a drum which carries a plurality of memory storage pins and which moving element is synchronized with the movement of the conveyor belt aforementioned. The pins are carried in bores and can be pushed or pulled so as to take either of two positions; for example, if the pins are carried on a belt they may be reciprocated in a plane normal to the belt or, if carried on a drum, they may be reciprocated radially. Thus, any pin can either be in a protruding position with respect to its carrier or in a receded position. Depending on a combination of positions of a plurality of pins, various switches in the path of the moving pins are actuated to trigger various diverting or push-off devices stationed along the length of the article-carrying conveyor belt, so that when a specific article arrives at a specific station it will be forced from the belt onto an auxiliary conveyor or down a chute, or the like. The positioning of the memory storage pins is accomplished by means of an operator at a keyboard; the operator can effect by appropriate manipulation of push buttons the setting of pins for the purpose of triggering respective switches or combinations of switches, depending on where it is desired to eject articles along the conveyor belt path.

A number of conveying systems as generally described above are known in the prior art. One such system, given as an example, is shown in the patent to O. M. Glahn, No. 1,868,894.

There is a certain drawback in prior art systems which use storage memory pins positionable in either of two positions, in that the detent means for holding such pins in either position is subject to wear, jamming, breakdown, and failure for various causes. Inasmuch as the entire system is dependent on the reliability of position holding of the pins, it will be apparent that the problem is quite critical. For example, detent mechanisms have been used which comprise the use of springs bearing against elements that frictionally engage the pins. Other devices use detent balls that ride in or out of peripheral grooves in the pins. However, such prior art methods have been found, for one reason or another, either to be unreliable, too complex, or too expensive to produce.

A particular problem arises in connection with the rapid pace of modern article or package handling which requires an absolutely certain detent means and one which preferably has as few moving parts as possible to wear or get out of order. Accordingly, the invention described herein is for the purpose of overcoming all of the above drawbacks by providing a detent means having no moving parts, of very simple and rugged construction, easily and relatively cheaply manufactured and readily incorporated into the memory storage component without special machining of such component and being virtually impossible to be rendered defective in operation.

Briefly, the invention is exceedingly simple in nature and construction and comprises the use of magnetic elements for holding pins in either of two positions. Thus, a pin may be mounted in a cast iron drum for radial movement and such pin may have a small bar magnet extending through it at each end. When the pin is extended or protruding, the bar magnet at the inner end of the pin contacts the inner surface of the drum and holds the pin in position. Alternatively, when the pin is pushed radially inward, the bar magnet carried at the outer end of the pin contacts the outer surface of the drum and holds the pin is position. It will thus be apparent that the detent means, consisting of a pair of small bar magnets permanently carried at the ends of each pin, uses no moving parts for detent purposes other than, of course, the necessary motion of the pin in performing its memory function. Thus, friction can cause no wear of such detent means, nor can any jamming occur.

The basic concept, as described above, may be carried out in a variety of ways, for example, the memory storage pins may be carried on a ferrous drum, belt, or chain. In the event that a belt is used, a thin lamination of flexible steel would form a facing on each surface of the belt, or a belt of thin gauge, flexible steel could be utilized. Likewise, an ordinary belt, for example, of rubber or flexible plastic could be used wherein the pin holding means would be a steel grommet having a flange flattened on each surface of the belt. In such case, the small bar magnets could be provided at each end of the pin or, alternatively, the grommet could be magnetized and each end of the pin be provided with a rivet head of ferrous metal, or the entire pin made of ferrous metal. The preceding and other variations and modifications will be described in greater detail in conjunction with the appended drawing, in which:

FIG. 1 shows a fragmentary, longitudinal section through a cast iron drum showing the basic elements of the invention;

FIG. 2 shows an elevation of the drum of the type shown in FIG. 1;

FIG. 3 shows a radial section of a drum of the type shown in FIG. 2;

FIG. 4 shows a variation of a storage memory pin;

FIG. 4a shows a longitudinal, fragmentary section through a modified form of drum, particularly usable with the pin of FIG. 4;

FIG. 5a shows fragmentarily in section a further modified form of drum;

FIG. 5b shows a still further modified form of drum;

FIG. 6a shows a section of a portion of a belt-type of pin carrier;

FIG. 6b shows a modification of the belt-type carrier;

FIG. 7 shows a section longitudinally of a portion of a link-chain type of pin carrier;

FIG. 8 is a sectional elevational detail of the chain type of pin carrier, the section being in plan; and FIG. 9 illustrates a still further modification of the invention, showing a fragmentary longitudinal section of a drum, as shown in FIG. 1, with a modified form of pin.

Referring now to the drawing and in particular to FIGS. 1, 2 and 3, a cast iron or steel drum 10 mounted for rotative support on bracket S is disclosed having a plurality of radial bores, such as 14, in which can reciprocate respective pins, such as 17, for example, of the type shown in the aforementioned patent to Glahn, FIG. 4. At the end of each pin is a small bar magnet 20. Since the surface of the drum is of very large radius compared with the length of the magnet, it will be apparent that the magnet may engage the drum either chordally or longitudinally and still maintain substantial physical contact with the inner or outer surface of the drum for effecting a magnetic holding force for either the inner or outer position of a pin. It will, of course, be apparent that where design conditions are such that a chordally disposed pin might not have sufficient area of contact, the bar magnets can be arcuately shaped to conform to the shape of the drum, the pins being splined to prevent rotation. However, for all practical purposes, in systems of the kind described, the drum is very large, perhaps some fifteen inches in diameter, while the bar magnet may be no more than a quarter of a half-inch in length, and, therefore, the ends of the magnets, namely, the poles, where the greatest attractive force is found, will engage over sufficient area to hold respective pins in inner or outer position. Regardless of relative dimensions, however, it will be apparent that a pin which is maintained so that the bar magnet is longitudinally disposed will always have the fully exposed length of its magnets engageable with the drum. Non-rotation of pins can be arranged in diverse ways; for example, a spline, a square pin, etc., may be used.

Referring to FIG. 3, a basic arrangement for actuating the pins is shown, wherein a solenoid 23 attracts an armature 26 to push pin 14 outwardly, in accordance with keyboard programming control. There are numerous ways of accomplishing the same purpose, all generally dependent upon solenoid actuation. For resetting or neutralizing the pins a fixed cam 30, exterior of the drum, may be utilized which pushes the pins to inner position as the drum rotates. The general arrangement for actuating the pins to either position is schematic and merely for purpose of illustration; the prior art is well supplied with disclosures to achieve the pin movement effects.

Referring to FIG. 4, a different type of magnet arrangement is disclosed wherein a pin 34 has disc magnets at each end. Thus, pin 34 may be of hardened steel with an integral head 37 and an opposite head 40 threaded thereon as by threads 43, such head 40 likewise being of hardened magnetizable steel. Accordingly, the dumbbell-shaped arrangement of FIG. 4 may be magnetized with north and south ends and then disassembled for incorporation in a drum in an obvious manner. Such a pin would be well adapted for use with a plastic drum, such as shown fragmentarily in FIG. 4a, wherein the plastic drum 46 is provided with bores such as 49 at pin locations, and has steel grommets such as 52 secured in the bores, thus effecting flanges 52a and 52b to serve as armatures for the magnetic discs 37 and 40.

Referring now to FIG. 5a, a further modified form of drum 55 is shown which may be of metal or plastic and has inserted therein a steel washer 58 to effect an armature with a pin such as the pin 34 as described in connection with FIG. 4. The armature disc or washer 58 may be shrunk fit into place or, as shown in FIG. 5b, it may be provided with threads 61 so as to be threaded in place on drum 64.

Still referring to FIGS. 5a and 5b, it will be apparent that the washer 58 or 61 may be of hardened steel and permanently magnetized with north and south flanges to give still further attracting force to the polarized magnetic ends of pins 34. It will further be apparent that pin 34 may have non-magnetized ends and still coact with a force of magnetic attraction with magnetized discs 58 or 61.

Referring now to FIG. 6a, a fragmentary section of a flexible belt 67, such as rubber or the like, is shown, such section being either transverse or longitudinal due to the symmetry of the structure and being provided with steel grommets such as 70 for slidably securing pins, for example, a pin of the form shown in FIG. 1. In such case, the grommet effects an armature for the bar magnets at the end of the pin. The use of belts carrying pins as memory storage devices is not new in the art, for example, such an arrangement is shown in the Glahn patent aforementioned, FIG. 3. In the present instance, however, the considerable simplification of a memory storage belt should be noted, such simplification being a direct result of the use of the novel magnetic detent means disclosed herein.

Referring now to FIG. 6b, a flexible belt such as 70 is again disclosed having grommets such as the grommet 73 and a pin of the form shown in FIG. 4. In this instance, the pin may be considered as being of plastic, e.g., nylon and having magnetic discs secured at its ends. In such case, grommet 73 is non-magnetized and serves as an armature. Alternatively, the grommet may be magnetized, the end discs serving as armatures, all as generally described above in connection with FIGS. 5a, 5b and 6.

Referring to FIG. 7, a portion of a bar type carrier is disclosed having side links, such as 76, which will be understood to be on both sides of the carrier, and between which links are carried bars such as 80 suitably apertured at 83 to carry pins of the type shown in FIG. 1. The bars carry pins of the form shown in FIG. 1 and may be square or flattened at the top and bottom, as shown in FIG. 7, in order to provide maximum engagement area with the bar magnets 20. As shown in FIG. 8, the bars are preferably provided with a square end 86 so as to be restrained against rotation, such square end fitting in a correspondingly shaped aperture in one of the links. However, the other link is provided with a round aperture to take a circular extension or trunnion 89 of the bar so that the links can pivot with respect to each other in order to form a continuous belt or carrier. The carrier may be motivated by sprocket wheels (not shown) acting on the spaced bars 83.

From the foregoing disclosures, it will be apparent that direct magnetic actuation for setting of the pins, as shown in the prior art, would be enhanced by polarized ends, e.g., pins as shown in FIGS. 4 and 9.

In FIG. 9, a drum such as the drum 10 of FIG. 1 is disclosed, apertured for respective pins at 14 wherein the pins are strongly magnetized rods 90. In this case, it will be understood that the thickness of the material of the drum is sufficient to give suitable magnetic flux contact area with the pin ends and that the pins, in order to insure against loss, must be very strongly magnetized, for example, ceramic magnetic pins would be suitable for such application and various form of modern magnetic materials are likewise believed suitable.

Having thus described the invention, it is understood that many changes and variations may be effected without departing from the spirit thereof and, accordingly, the invention is not limited to the precise illustrations herein given except as set forth in the appended claims.

What is claimed is:

1. A memory storage device comprising a continuously movable carrier of ferrous material, a plurality of pins carried by said carrier and reciprocally movable to alternate positions with respect thereto as said carrier moves, and magnetic means carried by said pins and engageable with said carrier for retaining said pins in either of two alternate positions.

2. In a memory storage device, a carrier element, a memory storage element carried by said carrier element and mounted for movement to either of two alternate positions with respect thereto, one of said elements having magnetized means comprising spaced magnetic surfaces for effecting retention of said memory storage element by magnetic effect in either of said alternate positions, the other of said elements having armature means engageable by said magnetic surfaces.

3. In a device as set forth in claim 2, said memory storage element comprising a pin, said carrier element comprising a drum having a radial bore therethrough in which said pin is slidable from an inner to an outer radial position, to protrude for the most part externally of said drum in one position or internally thereof in another position.

4. In a memory storage device, a carrier element, a memory storage element carried by said carrier element and mounted for movement to either of two alternate positions with respect thereto, one of said elements having spaced magnetized means for effecting magnetic retention of the other element in either of said alternate positions, and the other element having armature means selectively engageable by said magnetized means.

5. In a device as set forth in claim 4, said memory storage element comprising a member having spaced ends, said magnetized means comprising a magnetic device at respective ends.

6. In a device as set forth in claim 5, each of said magnetic devices comprising a bar magnet.

7. A memory storage device comprising a continuously movable carrier of ferrous material, a plurality of pins carried by said carrier and reciprocally movable to alternate positions with respect thereto as said carrier moves, and magnetic means carried by said pins and engageable with said carrier for retaining said pins in either of two alternate positions, said magnetic means comprsing a bar magnet carried at each end of each pin and having an axis disposed normal to the respective pin axis.

8. In a device as set forth in claim 7, said carrier being a drum, said pins extending through respective bores in said drum and being slidable in said bores, the respective bar magnets being engageable with the exterior and interior surfaces of said drum to hold said pins in protruding or receding positions with respect to the outer surface of said drum.

9. In a memory storage device, a carrier element, a memory storage element carried by said carrier element and mounted for movement to either of two alternate positions with respect thereto, one of said elements having magnetized means for effecting retention of said memory storage element in either of said alternate positions, the other of said elements having armature means engageable by said magnetized means, said memory storage element comprising a pin, said carrier element comprising a drum having a radial bore therethrough in which said pin is slidable from an inner to an outer radial position to protrude for the most part externally of said drum or internally thereof, said magnetized means being carried at each end of said pin, one such magnetized means being disposed externally of said drum and the other of said magnetized means being disposed internally of said drum, said armature means being on said drum and comprising ferromagnetic areas engageable alternatively externally or internally of said drum by respective magnetized means depending upon the position of said pin.

References Cited by the Examiner
UNITED STATES PATENTS

| | | | |
|---|---|---|---|
| 1,868,894 | 7/32 | Glahn | 214—11 |
| 2,536,133 | 1/51 | Klammer et al. | |
| 2,609,221 | 9/52 | Schultz | 317—159 |
| 2,666,536 | 1/54 | Smith | 214—11 |
| 2,690,800 | 10/54 | Ross. | |
| 2,770,975 | 11/56 | Galley | 74—568 |
| 2,816,254 | 12/57 | Canepa | 317—201 |
| 2,999,341 | 9/61 | Alexander et al. | 317—159 |
| 3,026,743 | 3/62 | Curtis | 74—568 |
| 3,100,040 | 8/63 | Kleist. | |
| 3,103,824 | 9/63 | Grumann. | |

BROUGHTON G. DURHAM, *Primary Examiner.*